(12) United States Patent
Lin

(10) Patent No.: US 7,524,365 B2
(45) Date of Patent: Apr. 28, 2009

(54) AIRFLOW CHANNEL MODULE FOR OXYGEN CONCENTRATOR

(75) Inventor: Yueh Chen Lin, Tai Chung Hsien (TW)

(73) Assignee: Taiwan An I Co., Ltd., Chiayi County (TW)

( * ) Notice: Subject to any disclaimer, the term of this patent is extended or adjusted under 35 U.S.C. 154(b) by 423 days.

(21) Appl. No.: 11/507,000

(22) Filed: Aug. 21, 2006

(65) Prior Publication Data
US 2007/0295214 A1    Dec. 27, 2007

(30) Foreign Application Priority Data
Jun. 27, 2006    (CN)    .................... 2006 2 0121343 U

(51) Int. Cl.
*B01D 53/04*    (2006.01)
(52) U.S. Cl. .................... 96/121; 128/205.24
(58) Field of Classification Search .................... 96/121, 96/130, 133, 143; 128/204.18, 204.21, 205.12, 128/205.27, 205.24; 95/128
See application file for complete search history.

(56) References Cited
U.S. PATENT DOCUMENTS
4,925,464 A * 5/1990 Rabenau et al. ............... 96/124
5,002,591 A * 3/1991 Stanford ......................... 95/98
5,730,778 A * 3/1998 Hill et al. ....................... 95/12
6,068,680 A * 5/2000 Kulish et al. .................... 95/98
2006/0230939 A1* 10/2006 Bliss et al. ..................... 96/121
2006/0283325 A1* 12/2006 Sugano ......................... 96/121

* cited by examiner

*Primary Examiner*—Frank M Lawrence
(74) *Attorney, Agent, or Firm*—Rabin & Berdo, P.C.

(57) ABSTRACT

An airflow channel module for oxygen concentrator is provided, including at least two molecular sieves, an oxygen storage unit, an air expelling unit, an air channel module, an air intake/expel module, and an automatic valve. The airflow channel module utilizes the oxygen storage channel and the air channel hidden inside the air channel module, the air intake channel, the air expelling channel and the air supply channel hidden in the air intake/expel module, and the automatic valve to control the flow of the air, oxygen and the nitrogen. By modularizing the airflow channel and eliminating the exposed hoses in conventional oxygen concentrator, the airflow channel module simplifies the assembly and maintenance of the oxygen concentrator.

15 Claims, 9 Drawing Sheets

AIRFLOW CHANNEL MODULE FOR OXYGEN CONCENTRATOR

FIELD OF THE INVENTION

The present invention generally relates to an oxygen concentrator, and more specifically to an airflow channel module applicable to the molecular sieves of an oxygen concentrator to substitute the conventional exposed air flow hoses. The airflow channel module simplifies the structure of an oxygen concentrator and facilitates easy production and maintenance.

BACKGROUND OF THE INVENTION

FIG. 1 shows a three-dimensional view of a conventional oxygen concentrator, including two molecular sieves 81, 82, an oxygen tank 83, a plurality of hoses 84 connected to both molecular sieves 81, 82, an electromagnetic (EM) valve 85 and a plurality of hoses 86 connected to EM valve 85. The operation of an oxygen concentrator is to guide the external air into one of the molecular sieves through the control of EM valve 85. The special molecular in the sieves can absorb the nitrogen so that the remaining air is high-purity oxygen. The remaining high-purity oxygen enters oxygen tank 83 through hoses 84. At the same time, the other molecular sieve expels the nitrogen out through EM valve 85. The two molecular sieves take turns to perform the absorb/expel operation to continuously outputting high-purity oxygen. However, the conventional oxygen concentrator has the following disadvantages:

1. A plurality of hoses 84, 86 must be correctly and accurately assembled to the corresponding parts of the oxygen concentrator so as to prevent leakage. The assembly process is time-consuming and inconvenient.
2. The oxygen concentrator consists of a large number of constructing elements, which leads to high manufacturing cost as well as high storage cost.
3. The hose connection is complex and increases the maintenance difficulty.
4. The exposed hoses are both ugly and prone to danger; therefore, a large encasing unit is required to house the entire structure, which results in further cost.

It is imperative to provide an airflow channel module for the oxygen concentrator to improve the above disadvantages.

SUMMARY OF THE INVENTION

The present invention has been made to overcome the above-mentioned drawback of a conventional oxygen concentrator. The primary object of the present invention is to provide an airflow channel module to substitute the exposed plurality of hoses connecting to molecular sieves of the oxygen concentrator to simplify the assembly, manufacturing and maintenance of the oxygen concentrator.

Another object of the present invention is to provide an airflow channel module, including an air channel module and an air intake/expel module and an automatic valve. The individual modules can be used separately or together to substitute the corresponding parts of an oxygen concentrator.

To achieve the above objects, the present invention provides an oxygen concentrator, with one side of oxygen concentrator including two molecular sieves, an air expelling unit, an air intake/expel module, and an automatic valve. Two molecular sieves and the air expelling unit are placed on one side of the air intake/expel module. The air intake/expel module includes at least an air expelling channel, at least two air intake channels, and an air supply channel. The air expelling channel is connected to the air expelling unit. Two air intake channels are connected to the two molecular sieves. The air supply channel is connected to the external air supply facility. The automatic valve is on the other side of the air intake/expel module, and is connected respectively to the air expelling channel, two air intake channels, and the air supply channel for ensuring that the external air supply facility only supplies air to one molecular sieve and the other molecular sieve is performing expelling air at the same time.

The structure at the other end of the oxygen concentrator includes two molecular sieves, an oxygen storage unit and an air channel module. The two molecular sieves and the oxygen storage unit are connected to one side of the air channel module. The airflow channel module includes at least an oxygen storage channel and an air channel. The oxygen storage channel is connected respectively with two molecular sieves and the oxygen storage unit. The oxygen storage channel includes two uni-directional valves so that the oxygen can only flow from molecular sieves through the oxygen storage channel to the oxygen storage unit. The air channel is connected to two molecular sieves, and includes a flow control valve for controlling the air flow.

The airflow channel module of the oxygen concentrator of the present invention includes two molecular sieves, an oxygen storage unit, an air expelling unit, an air channel module, an intake/expel module and an automatic valve. The two molecular sieves and the oxygen storage unit are connected to one side of the air channel module. The airflow channel includes at least an oxygen storage channel and an air channel. The oxygen storage channel is connected respectively with two molecular sieves and the oxygen storage unit. The oxygen storage channel includes two unidirectional valves so that the oxygen can only flow from molecular sieves through the oxygen storage channel to the oxygen storage unit. The air channel is connected to two molecular sieves, and includes a flow control valve for controlling the air flow. The air intake/expel module is on the other side of two molecular sieves. The air intake/expel module includes at least an air expelling channel, at least two air intake channels, and an air supply channel. The air expelling channel is connected to the air expelling unit. Two air intake channels are connected to the two molecular sieves. The air supply channel is connected to the external air supply facility. The automatic valve is on the other side of the air intake/expel module, and is connected respectively to the air expelling channel, two air intake channels, and the air supply channel for ensuring that the external air supply facility only supplies air to one molecular sieve and the other molecular sieve is performing expelling air at the same time.

In comparison, the airflow channel module of the present invention provides the following advantages:

1. easy assembly;
2. easy for inspection, only one single module requiring to be inspected after the assembly;
3. less number of components, reducing the manufacturing cost;
4. easy for maintenance, without the need to reconnect hoses after the maintenance; and
5. market competitiveness with the aforementioned advantages.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
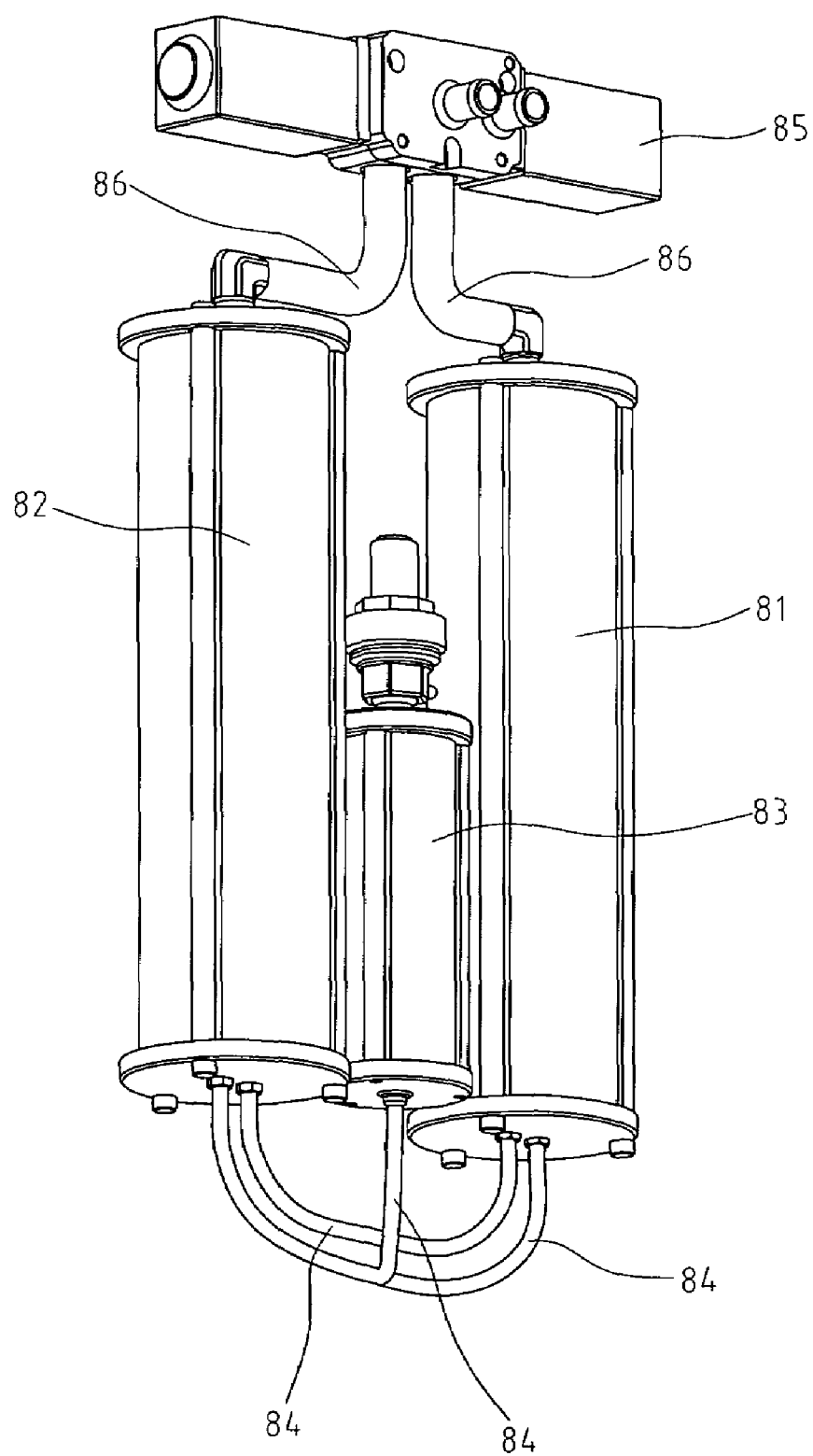
FIG. 1 shows a schematic view of a conventional oxygen concentrator.
Figure 2:
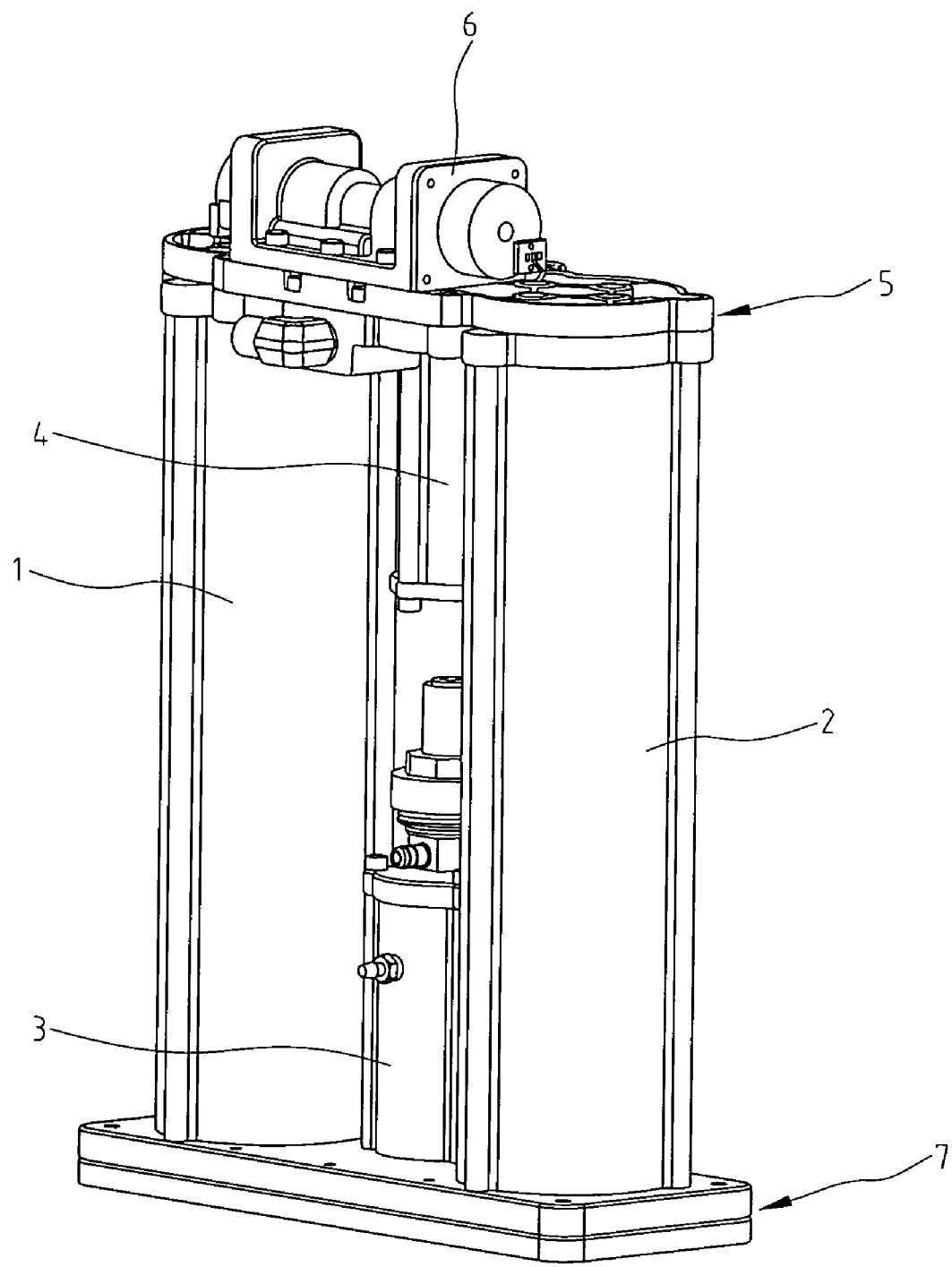
FIG. 2 shows a schematic view of an oxygen concentrator of the present invention.
Figure 3:
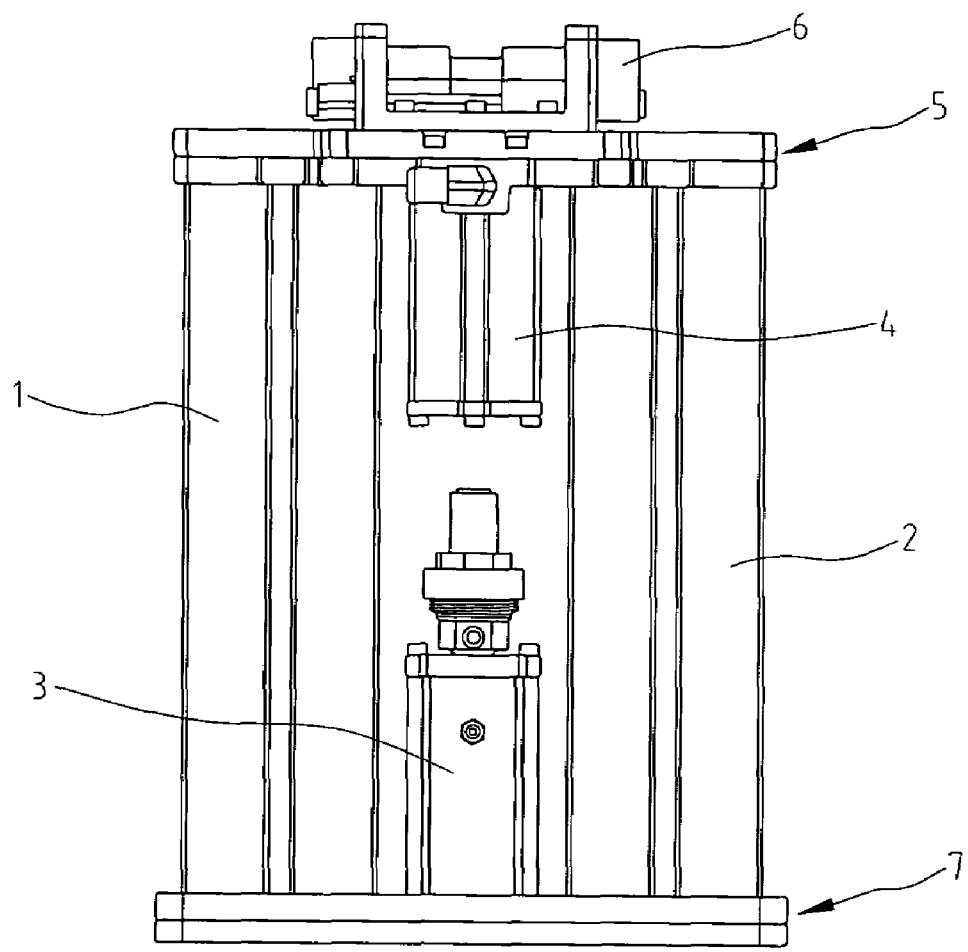
FIG. 3 shows a side view of the present invention.

FIGS. 2 & 3 show a schematic view and a side view of an oxygen concentrator of the present invention, respectively. An oxygen concentrator includes at least two molecular sieves 1, 2, an oxygen storage unit 3, an air expelling unit 4, an air intake/expel module 5, an automatic valve 6 and an air channel module 7. Air intake/expel module 5 is connected to an air supply facility so that the external can continuously enter the oxygen concentrator. The airflow is controlled by automatic valve 6 so that the external air can only enter one molecular sieve, then pass through air channel module 7 and enter oxygen storage unit 3 at one time, while the other molecular sieve performs the air expelling to expel the nitrogen through air expelling unit 4 at the same time. Air expelling unit 4 is a silencer to reduce the hiss caused by the highly pressurized nitrogen.

The feature of the present invention is on the airflow channel module for the oxygen concentrator. The airflow channel module includes air intake/expel module 5 and air channel module 7. The two modules further include a plurality of airflow channels for the air flow inside the oxygen concentrator. The following describes the structure and the operation of the modules.

Figure 4:
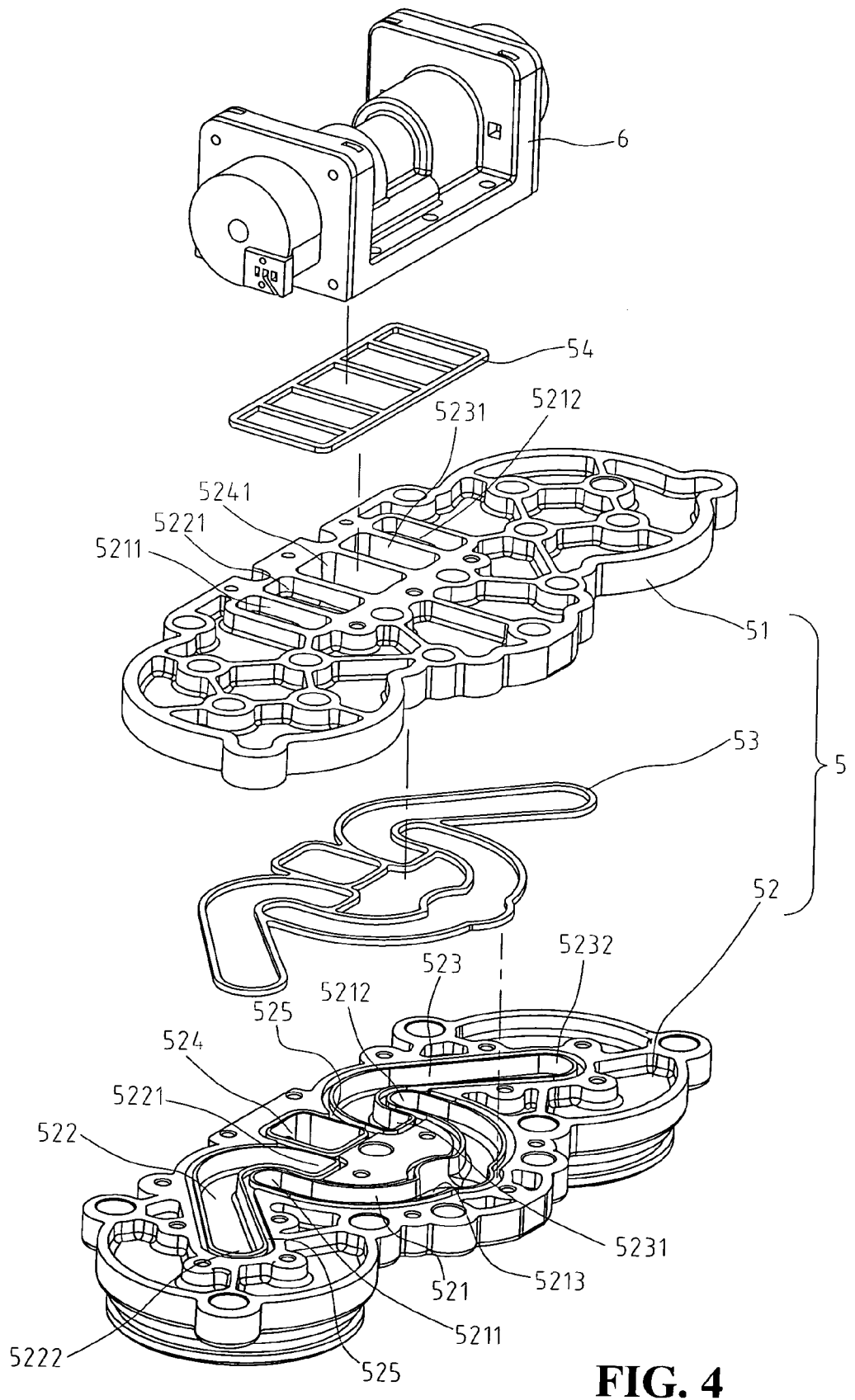
FIG. 4 shows an exploded view of the air intake/expel module of the present invention.

Air intake/expel module 5 is placed on one side of molecular sieves 1, 2, and work with automatic valve 6 so that one molecular sieve expels nitrogen when the external air enters the other molecular sieve. As shown in FIG. 4, air intake/expel module 5 includes a first covering body 51 and a second covering body 52. The internal of air intake/expel module further includes at least a air expelling channel 521, at least two air intake channels 522, 523, and an air supply channel 524. In this embodiment, The channels are located on second covering body 52 (shown in FIG. 6). Air expelling channel 521 has an arc shape, with two ends 5211, 5212 for expelling nitrogen and an outlet 5213 in the middle. Outlet 5213 is a via hole that connects to air expelling unit 4. Two air intake channels 522, 523 are connected to corresponding molecular sieves 1, 2, respectively. The inlets 5221, 5231 of air intake channels 522, 523 are connected with automatic valve 6, while outlets 5222, 5232 are via holes that are connected to molecular sieves 1, 2, respectively. Air intake channel 522, 523 are for allowing external air to enter molecular sieves and for nitrogen to pass through to automatic valve 6 for expelling. The details of the operation will be described later.

Figure 5:
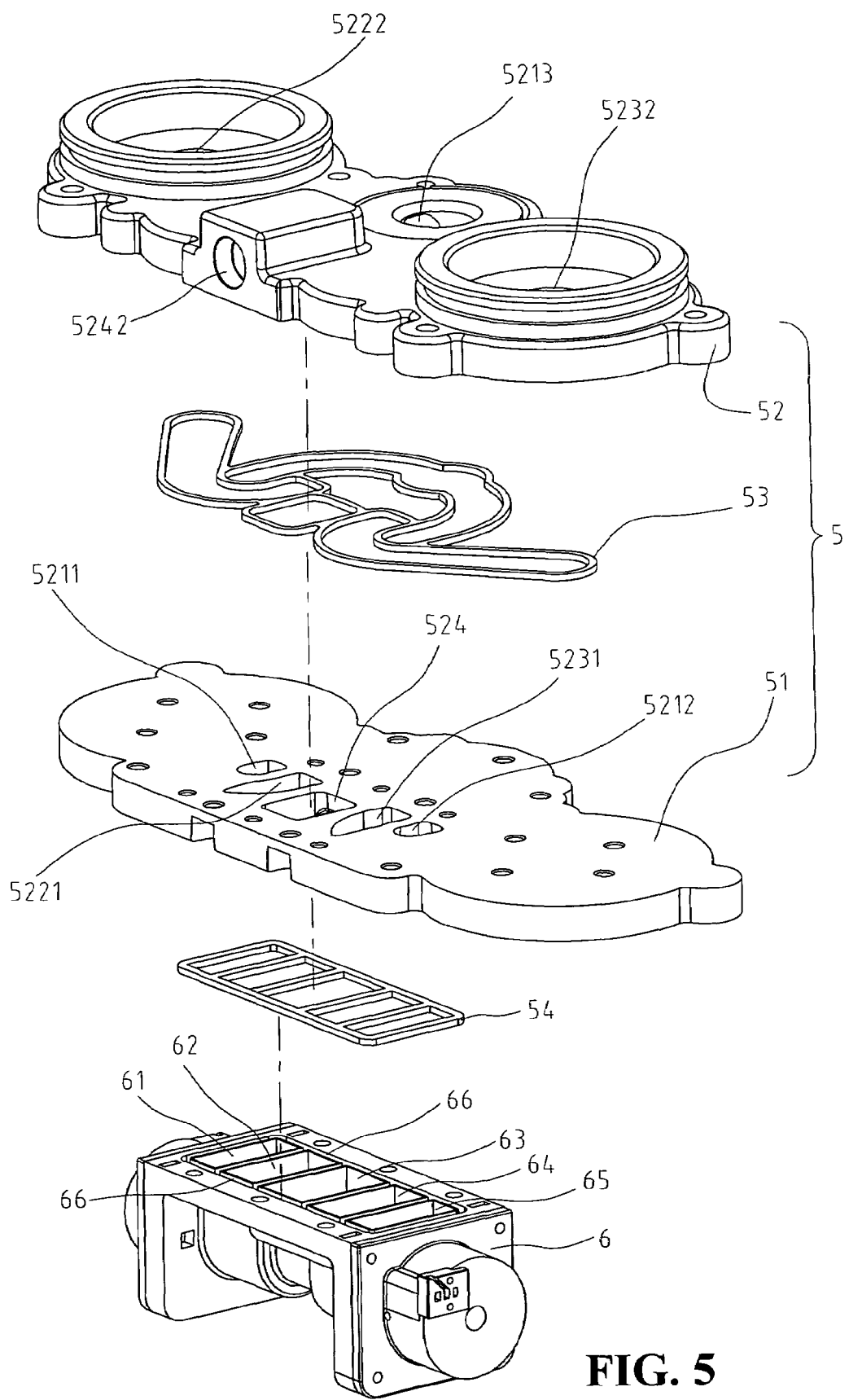
FIG. 5 shows another exploded view of the air intake/expel module of the present invention from a different angle.

Outlet 5241 of air supply channel 524 is connected to automatic valve 6, as shown in FIG. 5. Air supply channel 524 includes an inlet 5242 for connecting to an external air supply facility so that the external air can enter the molecular sieves. The air supply facility can be a compressor. Automatic valve 6 is located at the other side of first covering body 51, and includes a plurality of inlets/outlets 61, 62, 63, 64, 65 for connecting respectively to inlet 5211 of air expelling channel 521, inlet 5221 of air intake channel 522, outlet 5241 of air supply channel 524, inlet 5231 of air intake channel 523, and inlet 5212 of air expelling channel 521, all of first covering body 51. Automatic valve 6 of the present embodiment is an electromagnetic valve. Through the internal valve connections, the inlets and the outlets can be open or shut to change the air flow.

The following describes the air flow when automatic valve 6 operates. When the external air supply facility continuously supplies air through the air supply channel 524 to automatic valve 6, air supply channel 524 is connected with air intake channel 522, and the air enters molecular sieve 1 through air intake channel 522. At this time, inlet 5211 of air expelling channel 521 is shut, and inlet 5212 is open and connected to inlet 5231 of air intake channel 523 as controlled by automatic valve 6. Therefore, the nitrogen in molecular sieve 2 passes through air intake channel 523, automatic valve 6, inlet 5212 of air expelling channel 521, outlet 5213, and expelled from air expelling unit 4. On the other hand, when the external air enters air intake channel 523 through automatic valve 6, inlet 5212 is shut, and molecular sieve 1 performs the nitrogen expelling and molecular sieve 1 receives the air. In actual use, the two molecular sieves take turns in receiving air and expelling nitrogen.

Figure 6:
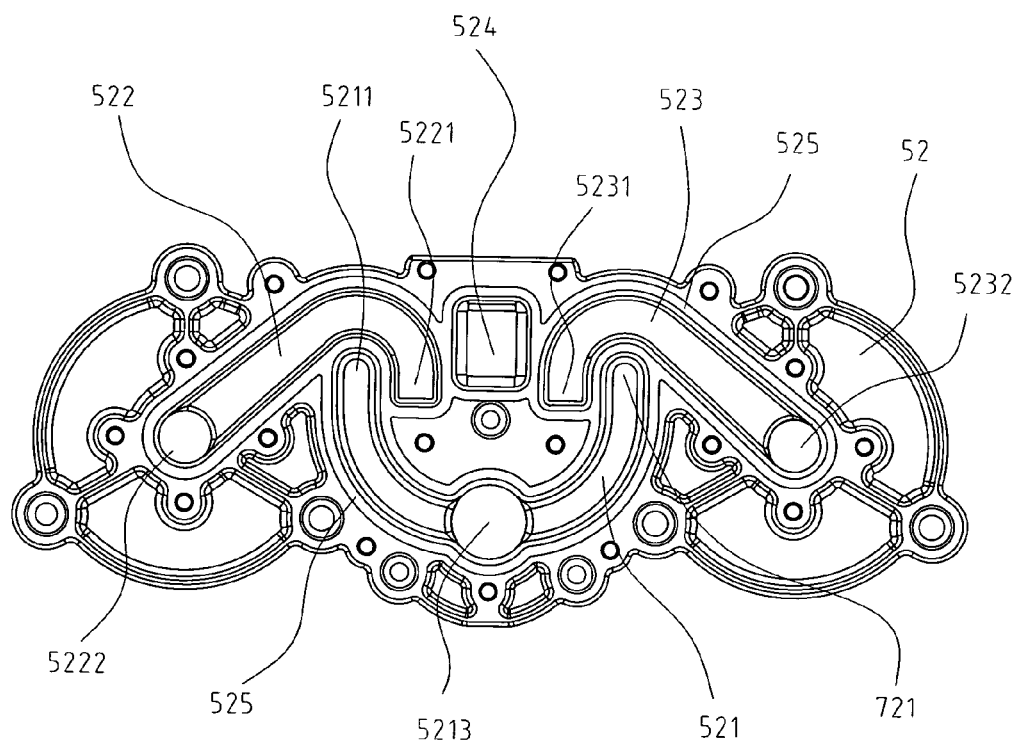
FIG. 6 shows a top view of the second covering body of the present invention.

As shown in FIGS. 4 & 6, air intake/expel module 5 includes a trench 525 surrounding air expelling channel 521, air intake channels 522, 523, and air supply channel 524. Trench 525 is located on second covering body 52 in the present embodiment. The present embodiment also includes an embedded matching-shape sealing pad 53 to provide better sealing. Sealing pad 53 is a monolithic component.

As shown in FIG. 5, a trench 66 is located surrounding inlets/outlets 61, 62, 63, 64, 65 of automatic valve 6 at the connection of air intake/expel module 5 and automatic valve 6. Also included is an embedded matching-shape sealing pad 54, which is a monolithic component.

Figure 7:
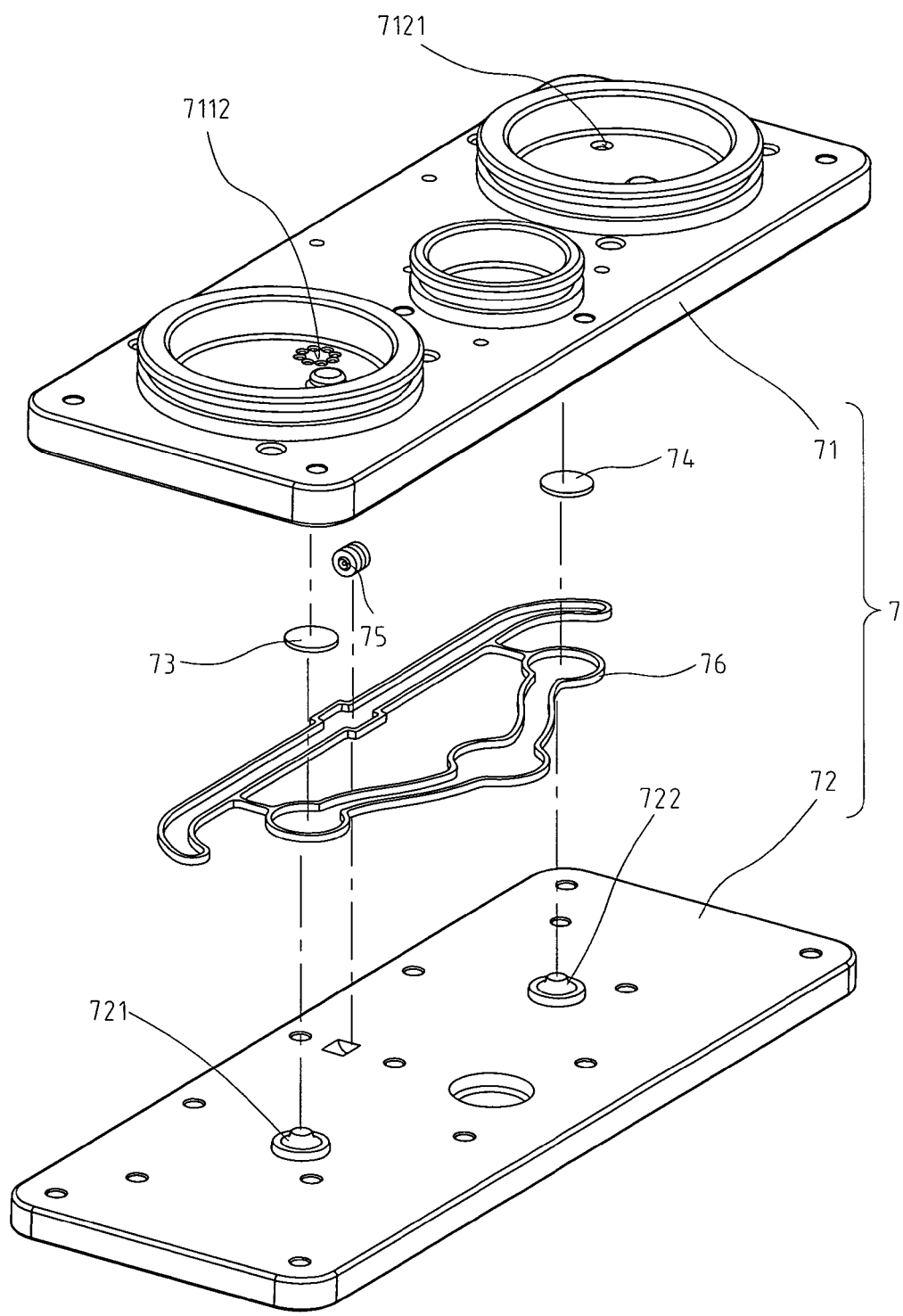
FIG. 7 shows an exploded view of the air channel module of the present invention.
Figure 8:
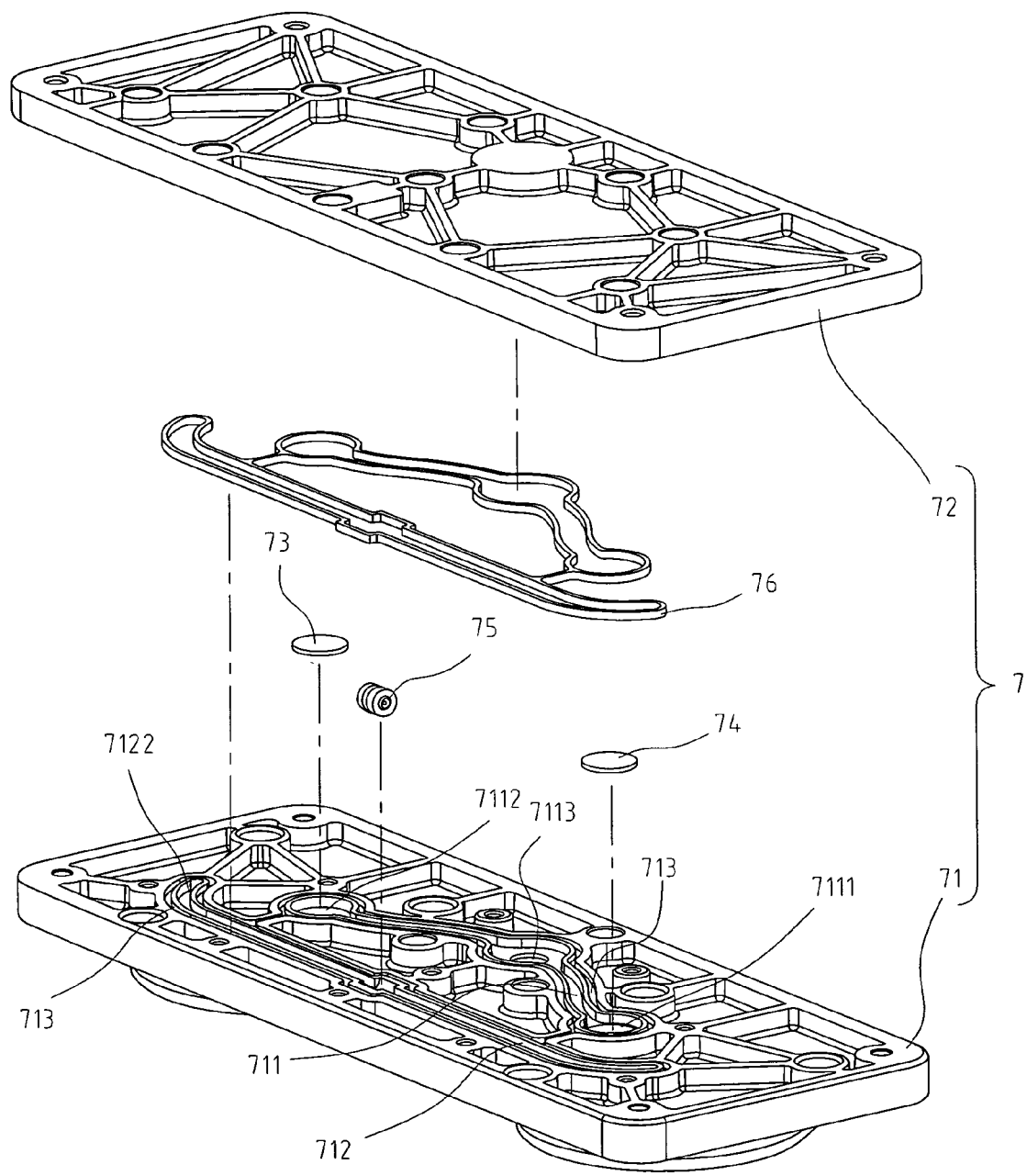
FIG. 8 shows another exploded view of the air channel module of the present invention from a different angle.
Figure 9:
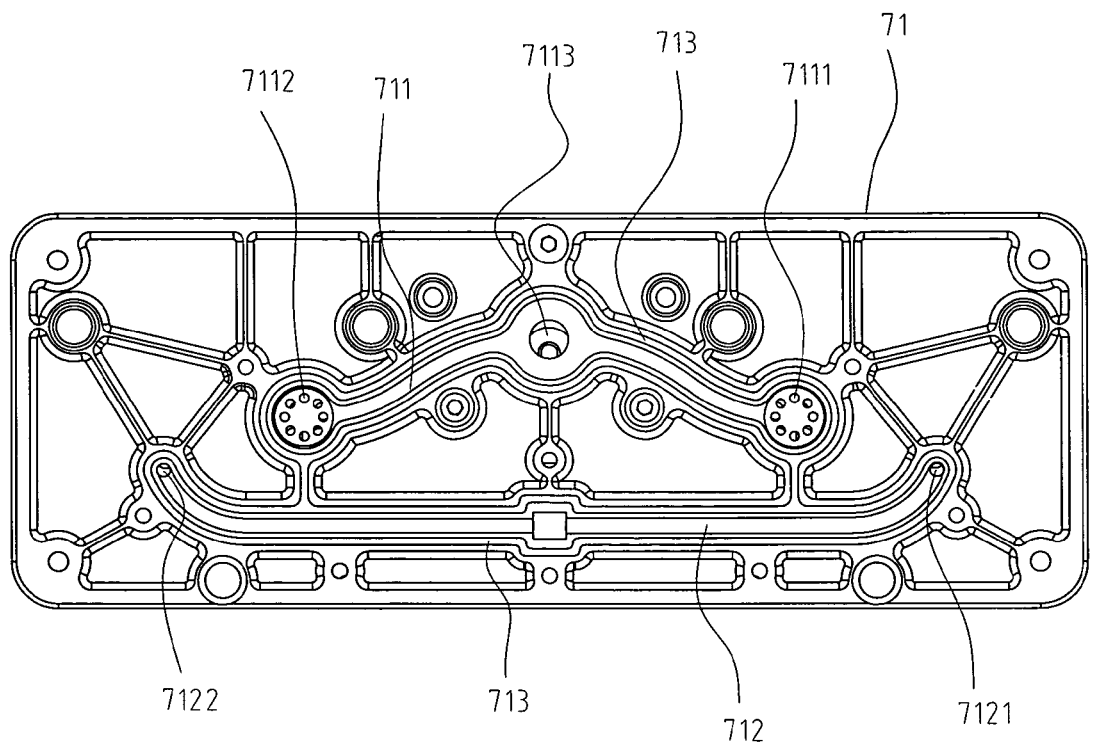
FIG. 9 shows a top view of the third covering body of the present invention.

The following describes air channel module 7. As shown in FIG. 2, air channel module 7 is located on the other side of molecular sieves 1, 2 for allowing the oxygen in the molecular sieves to enter oxygen storage unit 3. Oxygen storage unit 3 of the present invention is an oxygen tank, and the oxygen is compressed before outputting. However, the oxygen can be directly output. As shown in FIGS. 7 & 8, air channel module 7 includes a third covering body 71 and a fourth covering body 72. The internal of air channel module 7 includes at least an oxygen storage channel 711, and an air channel 712. In this embodiment, oxygen storage channel 711 and air channel 712 are located on third covering body 71, as shown in FIG. 9. Oxygen storage channel is a V-shaped channel with two inlets 7111, 7112 connecting respectively to molecular sieves 1, 2. An outlet 7113 at the middle of the channel is connected to oxygen storage unit 3. At least two uni-directional valves 73, 74 are located on oxygen storage channel 711 between inlets 7111, 7112 and outlet 7113, respectively. Hence, the oxygen can only flow from molecular sieves 1, 2 through oxygen storage channel 711 to oxygen storage unit 3. Air channel 712 is a lateral air channel with holes 7121, 7122 on both ends for connecting molecular sieves 1, 2, respectively. Air channel 712 includes a flow control valve 75 for controlling the flow.

In this embodiment, two uni-directional valves 73, 74 are resilient membranes. Inlets 7111, 7112 includes a plurality of small holes. Uni-directional valves 73, 74 cover inlets 7111, 7112, respectively. Cone-shaped protruding stubs 721, 722 are located near the respective inlets of fourth covering body 72, as shown in FIG. 7, to slightly touch the center of the membranes. When the oxygen from molecular sieves is to enter inlet 7111, 7112, protruding stubs 721, 722 slightly bends the membranes for allowing the oxygen to enter. On the other hand, when the oxygen in oxygen storage channel 711 is to exit from inlets 7111, 7112, uni-directional valves 73, 74 will cover the inlets to prevent the oxygen from exiting.

As shown in FIGS. 7 & 9, air channel module 7 includes a trench 713 surrounding oxygen storage channel 711 and air channel 712. The present embodiment also includes an embedded matching-shape sealing pad 76 to provide better sealing. Sealing pad 76 is a monolithic component.

The following describes the overall operation and the air flow of the oxygen concentrator. The air supply facility supplies the external air through air supply channel 524 of air intake/expel module 5 to automatic valve 6. When automatic valve 6 switches to supply the air to molecular sieve 1, the material inside will absorb the nitrogen, and the remaining oxygen will enter oxygen storage unit 3 through air channel module 7. At the same time, molecular sieve 2 is controlled by automatic valve 6 to make air intake channel 523 and air expel channel 521 of air intake/expel module 5 connected. Because air expelling unit 4 is connected to the outside, the nitrogen in molecular sieve 2 will be expelled from air expelling unit 4. During expelling nitrogen. Air channel 712 of air channel module 7 is controlled by controlling valve 75 to provide a small amount of pressurized oxygen from the bottom of molecular sieve 2 to speed up expelling nitrogen. When the nitrogen absorption in molecular sieve 1 reaches saturation, automatic valve switches to supply air to molecular sieve 2, and molecular sieve 1 starts to expel nitrogen. Thus, molecular sieves 1, 2 take turns to supply high purity oxygen.

In summary, the airflow channel module of the present invention is to integrate the complex conventional hoses used in oxygen concentrators into an air channel module and the air intake/expel module located on both sides of the molecular sieves. By reducing the number of the parts used in the oxygen concentrator, the present invention also simplifies the assembly and the maintenance of an oxygen concentrator as well as reducing manufacturing cost.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus of an airflow channel module for oxygen concentrator, comprising:
   at least two molecular sieves;
   an air expelling unit;
   an air intake/expel module, with said molecular sieves and said air expelling unit on one side, further comprising at least an air expelling channel, at least two air intake channels, and an air supply channel, said air expelling channel being connected to said air expelling unit, said air intake channels being connected respectively to said molecular sieves, and said air supply channel being connected to an external air supply facility; and
   an automatic valve, located on the other side of said air intake/expel module, connected to said air intake channels, air expelling channel, and air supply channel of said air intake/expel module, for controlling said external sir supply facility supplying air to one said molecular sieve, while the other said molecular sieve expelling nitrogen.

2. The apparatus as claimed in claim 1, wherein said air intake/expel module further comprises a first covering body and a second covering body, with said second covering body further comprising said air expelling channel, said two air intake channels, and said air supply channel, said air expelling channel having an inlet connected to said automatic valve and an outlet connected to said air expelling unit, two said air intake channels having an inlet connected to said automatic valve and an outlet connected to respective molecular sieve, said air supply channel having an inlet connected to the outside, which further connected to said external air supply facility, and an outlet connected to said automatic valve, said automatic valve being integrated to one side of said first covering body.

3. The apparatus as claimed in claim 1, wherein said air supply facility is a compressor.

4. The apparatus as claimed in claim 1, wherein said air expelling unit is a silencer.

5. The apparatus as claimed in claim 1, wherein said automatic valve is an electromagnetic valve.

6. The apparatus as claimed in claim 1, wherein a trench is located surrounding said air intake channels, air expelling channel, and said air supply channel of said air intake/expel module, and said trench has a sealing pad embedded for sealing.

7. The apparatus as claimed in claim 6, wherein said sealing pad is monolithic.

8. The apparatus as claimed in claim 1, wherein a trench is located surrounding the inlets near the joint of said air intake/expel module and said automatic valve, and said trench has a sealing pad for sealing.

9. The apparatus as claimed in claim 8, wherein said sealing pad is monolithic.

10. An apparatus of an airflow channel module for oxygen concentrator, comprising:
    at least two molecular sieves;
    an oxygen storage unit; and
    an air channel module, with said molecular sieves and said oxygen storage unit on one side, further comprising at least an oxygen storage channel and an air channel, said oxygen storage channel being connected to said two molecular sieves and oxygen storage unit, said oxygen storage channel having an uni-directional valve for allowing oxygen to exit said molecular sieves through said oxygen storage channel to said oxygen storage unit, the air channel being connected to said two molecular sieves, and having a controlling valve for controlling the flow.

11. The apparatus as claimed in claim 10, wherein said air channel module further comprises a third covering body and a fourth covering body, with said third covering body further comprising said oxygen storage channel and said air channel, said oxygen storage channel having two inlets connected to said respective molecular sieves and an outlet connected to said oxygen storage unit, said uni-directional valve being located between said inlets and said outlet of said oxygen storage channel.

12. The apparatus as claimed in claim 11, wherein said uni-directional valve is a resilient membrane that covers said inlets of said oxygen storage channel, and said fourth covering body comprises a cone-shaped protruding stub to slightly touch said membrane, when said air is to enter said inlet from said molecular sieves, said membrane is slightly bended to allow the entry, and when air is to exit said inlet, said membrane covers said inlet to prevent from exiting.

13. The apparatus as claimed in claim 10, wherein a trench is located surrounding said air channel and said oxygen storage channel of said air channel module, and said trench has a sealing pad embedded for sealing.

14. The apparatus as claimed in claim 13, wherein said sealing pad is monolithic.

15. An apparatus of an airflow channel module for oxygen concentrator, comprising:

at least two molecular sieves;

an oxygen storage unit;

an air channel module, with said molecular sieves and said oxygen storage unit on one side, further comprising at least an oxygen storage channel and an air channel, said oxygen storage channel being connected to said two molecular sieves and oxygen storage unit, said oxygen storage channel having an uni-directional valve for allowing oxygen to exit said molecular sieves through said oxygen storage channel to said oxygen storage unit, air channel being connected to said two molecular sieves, and having a controlling valve for controlling the flow;

an air intake/expel module, with said molecular sieves and said air expelling unit on one side, further comprising at least an air expelling channel, at least two air intake channels, and an air supply channel, said air expelling channel being connected to said air expelling unit, said air intake channels being connected respectively to said molecular sieves, and said air supply channel being connected to an external air supply facility; and an automatic valve, located on the other side of said air intake/expel module, connected to said air intake channels, air expelling channel, and air supply channel of said air intake/expel module, for controlling said external sir supply facility supplying air to one said molecular sieve, while the other said molecular sieve expelling nitrogen.

* * * * *